United States Patent Office 3,385,718
Patented May 28, 1968

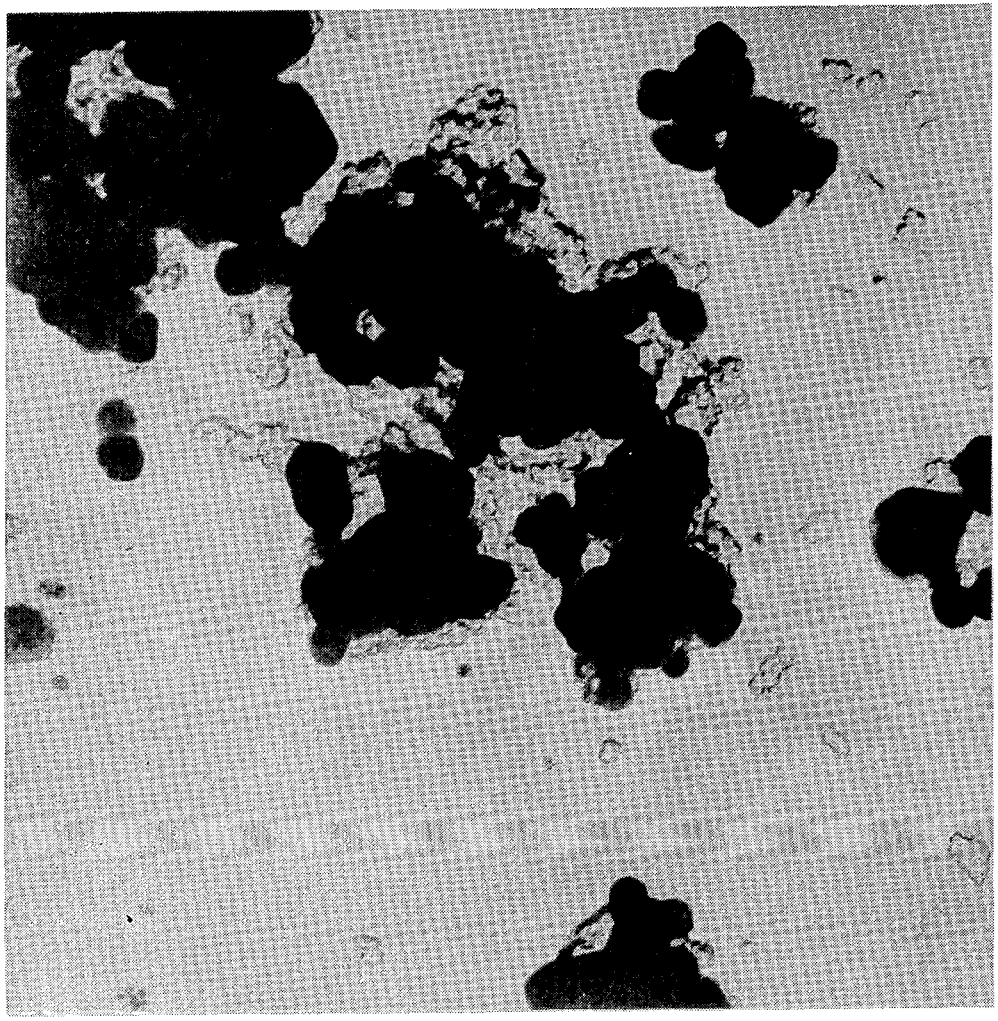

3,385,718
TITANIUM DIOXIDE-SILICA PIGMENT
Bradford C. Hafford and George E. Snow, Palmerton, Pa., assignors to The New Jersey Zinc Company, New York, N.Y., a corporation of Delaware
Filed Aug. 21, 1964, Ser. No. 391,334
3 Claims. (Cl. 106—288)

ABSTRACT OF THE DISCLOSURE

A titanium dioxide-silica composite pigment is produced by precipitating silica on suspended titanium dioxide as the result of progressively neutralizing with sodium silicate, in the presence of the suspended titanium dioxide, a definite acidic aqueous solution containing fluoride ions.

---

This invention relates to titanium dioxide pigments and, more particularly, to an improved titanium dioxide-silica pigment and to a method of making this improved pigment.

Titanium dioxide is widely used as a pigment or filler in paper because of its excellent color and opacity. It also exhibits a fair degree of retentivity, that is, the ability to be retained in admixture with the paper fibers without excessive loss in the water which is separated from the fibers in the sheet-forming operation. However, the relatively high cost of titanium dioxide, compared to other white pigments, has promoted extensive investigation of the possibility of extending it by other less expensive white pigments without degrading its advantages over these other pigments.

Silica has been found heretofore to be an effective white pigment extender of titanium dioxide for use in paper. In order to achieve substantial economy in the use of such an extender, it must be used in lieu of at least about 10% by weight of the titanium dioxide and preferably in amounts within the range of 20% to 40%. Numerous methods have been devised for effecting intimate admixture of a silicate or silica with titanium dioxide, including those of the United States patents to Mowlds No. 2,259,482, Hanahan No. 2,296,636, Robertson No. 2,346,188, Iler No. 2,885,366 and Taylor No. 2,943,971, as well as Australian Specification No. 101,724 and British Specification No. 905,367.

We have now found that silica can be precipitated in the presence of titanium dioxide in such way as to produce a composite pigment rather than a mere physical admixture of the two pigments. This novel product is obtained pursuant to the invention by progressively neutralizing a dilute acidic aqueous solution containing fluoride ions with sodium silicate in the presence of suspended titanium dioxide. The resulting composite product differs from a mere physical admixture of the same proportions of titanium dioxide and silica pigments by a significantly greater degree of opacity and by a greater degree of retentivity in paper than either of the pigments individually, with the retentivity of the titanium dioxide and silica components being substantially equal.

The method of the invention is capable of producing an improved pigment from either rutile or anatase titanium dioxide. However, for use as a paper pigment, anatase titanium dioxide is generally preferred over rutile, and for this reason it is presently preferred to precipitate the silica component of the new composite pigment in the presence of anatase titanium dioxide.

The precipitation of silica on the titanium dioxide is carried out, as set forth hereinbefore, by progressively neutralizing a dilute acidic aqueous solution containing fluoride ions with sodium silicate. These conditions are met, for example, by progressively neutralizing fluosilicic acid with sodium silicate. The fluosilicic acid can be a starting reactant or it can be formed by the initiation of neutralization of a dilute acidic aqueous solution containing fluoride ions with the alkali silicate solution, as in the case of progressively adding a sodium silicate solution to a sodium fluoride solution acidified with sulfuric or hydrochloric acid, etc., or to a dilute solution of hydrofluoric acid. The aforementioned conditions are also met by progressively neutralizing a dilute aqueous solution of sodium fluosilicate with the sodium silicate as well as by neutralizing a dilute solution of a mixture of fluosilicic acid and sulfuric or hydrochloric acid, or the like, with the sodium silicate. It will be readily apparent, accordingly, that the "fluoride ion" referred to herein and in the claims includes both simple and complex fluoride ions such, for example, as $F^-$ and $SiF_6^{--}$.

The aforementioned reaction conditions are not met by precipitating the silica merely in the presence of fluoride ions because it has been observed that the progressive neutralization of fluosilicic acid with a non-silicic base such as ammonia, when carried out in the presence of titanium dioxide pigment, will not produce the novel improved composite pigment of the present invention. The required reaction conditions are also not met by progressively adding fluosilicic acid to a sodium silicate solution because the early additions do not provide a significant concentration of fluoride ions, and it has been found that the silica produced by this means in the presence of the titanium dioxide pigment does not form the improved composite pigment of the present invention. The significance of the presence of fluoride ions in the acidic aqueous solution to which sodium silicate is added pursuant to the invention is illustrated by comparing a product obtained by adding sodium silicate to fluosilicic acid pursuant to the invention with the product obtained under identical conditions except for the use of a dilute solution of sulfuric acid in lieu of the diulte fluosilicic acid solution:

TABLE I

| Pigment | Pigment in Furnish [1] (Weight Percent) | Performance as a Paper Filler | |
|---|---|---|---|
| | | Percent Brightness [2] | Percent Opacity [3] |
| 70% TiO$_2$–30% SiO$_2$ pptd. from sulfuric acid | 9.58 | 88.8 | 70.0 |
| 70% TiO$_2$–30% SiO$_2$ pptd. from fluosilicic acid | 9.58 | 90.0 | 75.5 |

[1] Based on oven-dry furnish solids.
[2] Brightness by TAPPI Method T–452.
[3] Opacity by TAPPI Method T–425.

In precipitating silica on titanium dioxide pursuant to the invention, the sodium silicate should be added to the acidic reaction component in an amount sufficient to yield a substantially neutral reaction mass. The total source of silicon in the silicious materials should be sufficient to yield, by the neutralization reaction, the desired amount of silica combined with the titanium dioxide in the composite pigment of the invention. The amount of water introduced into the reaction environment should be such as to form a workable slurry of sufficient fluidity as to promote the neutralization reaction.

The concentration of the sodium silicate solution can be varied considerably without a significant effect on the properties of the final composite pigments. For example, in the preparation of a 70–30 $TiO_2:SiO_2$ composite pigment pursuant to the invention, a sodium silicate having a 2:1 ratio of $SiO_2:Na_2O$ was added in the form of solutions ranging from 56 to 225.5 grams of $Na_2O$ per liter and a sodium silicate having a 3.25:1 ratio of $SiO_2:Na_2O$ was added in the form of solutions ranging from 31 to 124 grams of $Na_2O$ per liter, all with no significant effect on the performance of the resulting composite pigment in paper. Accordingly, for handling efficiency, it is presently preferred to use the sodium silicates in the highest concentrations in which they are generally available commercially.

The composition of the sodium silicate can also be varied considerably in the practice of the invention, as can be seen from the following table of data obtained by progressively neutralizing fluosilicic acid with sodium silicate in the presence of suspended titanium dioxide:

TABLE II

| Sodium Silicate | | $TiO_2$, g./l. of $H_2SiF_6$ (sol.) | Performance as a Paper Filler [1] | | |
|---|---|---|---|---|---|
| ($SiO_2:Na_2O$) | $Na_2O$ (g./l.) | | Retention,[2] Percent | Brightness,[3] Percent | Opacity,[4] Percent |
| 1 | 100 | 60 | 27.7 | 89.7 | 75.5 |
| 2 | 225.5 | 106 | 28.4 | 90.1 | 75.8 |
| 3.25 | 124 | 155 | 29.6 | 89.8 | 75.2 |

[1] Based on 9.58 wt. percent pigment in the oven-dry furnish solids
[2] In single pass through system.
[3] Brightness by TAPPI Method T–452.
[4] Opacity by TAPPI Method T–425.

In each instance in Table II, the initial concentration of the $H_2SiF_6$ solution was 1.5% and the precipitation was performed at 70° C. As can be seen from the table, the retention increased with increasing $SiO_2$ content of the sodium silicate but this had no significant effect on brightness or opacity. From a practical standpoint the overriding aspect of this data is the marked drop in raw material costs associated with increasing the $SiO_2$ ratio of the sodium silicate.

The reaction temperature at which precipitation of the silica on the titanium dioxide is carried out pursuant to the invention appears to have some effect upon the opacifying characteristics of the composite pigment. Optimum opacity is generally obtained with reaction temperatures between about 60° and 80° C. Higher temperatures up to the boiling point of the reaction mass can be used but appear to slightly degrade the opacifying character of the pigment. Temperatures below about 60° C. also tend to degrade this pigment characteristic but to a greater extent, and therefore it is presently preferred not to use temperatures lower than about 40° C.

The degree of agitation maintained during precipitation of the silica on the titanium dioxide pursuant to the invention also appears to have some effect upon the opacifying characteristics of the composite pigment. That is, mild or vigorous agitation lead to measurably lower opacifying characteristics than moderate agitation. Such moderate agitation is represented by operating a two inch diameter propeller-type impeller within the range of 400 to 600 r.p.m. in a six inch diameter precipitation vessel, and within this range a higher speed is preferred with a higher $SiO_2:Na_2O$ ratio in the sodium silicate reactant.

The pigment product of the present invention appears to be a composite $TiO_2$–$SiO_2$ pigment, rather than a mere physical mixture of the two pigments. This is shown in the accompanying electron photomicrograph at 65,000 magnification in which the titanium dioxide is the dark-colored mass and the silica is the light-colored mass surrounding the particles or cluster of particles of titanium dioxide. In this photograph the light-colored unit-length line represents one micron.

Evidence of the composite characteristics of the new pigment also appears from the following table:

TABLE III

| Pigment | Pigment in Furnish[1] (Weight Percent) | Percent $TiO_2$ Retention [2] | Percent $SiO_2$ Retention [2] | Percent Brightness [3] | Percent Opacity [4] |
|---|---|---|---|---|---|
| $TiO_2$ | 9.58 | 18.7 | | 88.0 | 70.5 |
| $SiO_2$ | 6.60 | | 16.0 | 87.0 | 64.7 |
| $SiO_2$ | 12.38 | | 16.2 | 88.1 | 68.2 |
| Blend (60% $TiO_2$ plus 40% $SiO_2$) | 6.60 | 24.0 | 8.0 | 88.0 | 66.7 |
| Blend (60% $TiO_2$ plus 40% $SiO_2$) | 12.38 | 26.0 | 9.9 | 88.4 | 72.9 |
| Composite (60% $TiO_2$–40% $SiO_2$) | 9.58 | 33.0 | 30.2 | 89.0 | 72.6 |

[1] Based on oven-dry furnish solids.
[2] In single pass through system.
[3] Brightness by TAPPI Method T–452.
[4] Opacity by TAPPI Method T–425.

From Table III, it will be seen that under paper-making conditions in which the best commercially available titanium dioxide pigment for paper exhibits a single-pass retention in the paper of about 18.7% and the best commercially available silica pigment shows a retention in the paper of about 16%, a physical mixture (blend) of these two pigments in the proportion of 60 parts by weight of titanium dioxide and 40 parts of silica, when added to the same paper furnish, causes the retention of the titanium dioxide component of the mixture to be raised and the retention of the silica component to be reduced, regardless of whether the mixture is used in a lower or higher loading level than the individual components of the mixture. In contrast, a composite pigment of the present invention containing 60% $TiO_2$ and 40% $SiO_2$ has a paper retention of about 33% measured in terms of $TiO_2$ content, or about 30% measured in terms of $SiO_2$ content, with no significant difference in the retention of either the titanium dioxide or silica components. Comparable evidence of the composite character of the pigment of the invention appears from opacity measurements on the pigmented paper: the opacity with the titanium dioxide is 70.5% and that with the silica is between about 65 and 68%; the opacity with the physical mixture (blend) of 60 parts of the titanium dioxide and 40 parts of silica is about 67 to 73%; the opacity with the 60:40 $TiO_2$–$SiO_2$ composite pigment of the invention is 72.6%, this opacity being substantially that which is obtained when the higher loading level of 12.38% of the blend is incorporated in the paper. The silica thus appears to be bonded to the titanium dioxide to produce a pigment that is superior to either titanium dioxide or silica alone or in physical admixture with one another.

The superiority of the composite titanium dioxide-silica pigment of the invention readily appears when it is incorporated in paper. The following table presents the opacity of paper for three different percentages of additions to the paper furnish of straight anatase titanium dioxide, of a 70–30 physical mixture of this titanium dioxide and high quality silica pigment, and of the composite pigment of the invention:

TABLE IV

| Pigment | Pigment in Furnish,[1] wt. percent | | |
|---|---|---|---|
| | 6.60 | 12.38 | 17.49 |
| | Opacity,[2] percent | | |
| $TiO_2$ | 68.8 | 74.7 | 79.0 |
| 70 $TiO_2$ plus 30 $SiO_2$ | 68.3 | 74.5 | 78.3 |
| Composite (70 $TiO_2$:30 $SiO_2$) | 70.0 | 76.2 | 81.0 |

[1] Based on oven-dry furnish solids.
[2] Opacity by TAPPI Method T-425.

Interpolation from the foregoing table shows that in order to obtain the paper opacity achieved with any specific amount of the composite pigment of the invention, one must add to the paper furnish at least a 10% (actually 15.7% from Table IV data) greater quantity of the same proportions of titanium dioxide and silica in physical admixture with one another. The composite pigment also shows a superior opacity over that of the straight titanium dioxide pigment.

The amount of silica which can be used advantageously in the composite pigments of the invention is generally determined by economical considerations rather than by chemical considerations. For example, the superior composite pigments of the invention can be produced pursuant to the method of the invention ranging from 20% to 60% and more of silica. The cost of treatment of the titanium dioxide by this method substantially offsets the pigment improvement in opacity and retention when the silica content is less than about 20% silica, but the improvement in retention and opacity achieved with silica contents of 20% and above more than justify the cost of the treatment. However, as the silica content increases beyond about 60%, the opacity of the composite pigment decreases progressively, apparently due to the inability of the titanium dioxide to combine with more than about one and a half times its own weight of silica. Nevertheless, even with 90% silica in the composite pigment, the resulting pigment, comprising the titanium dioxide-silica composite plus uncombined silica, exhibits better opacity and retention characteristics than the same proportions of titanium dioxide and silica in mere physical admixture.

The following example is illustrative of the practice of the invention wherein the pigment was produced by the reaction between two silicic materials in the presence of a significant concentration of fluoride ions by progressively neutralizing a dilute solution of fluosilicic acid with sodium silicate in the presence of suspended titanium dioxide pigment:

PRODUCTION OF PIGMENT

A charge of 4.89 kg. of anatase $TiO_2$ was dispersed in 12 liters of water in a polyethylene tank. To this dispersion, 2.72 liters of an aqueous solution containing 246 g./l. of $H_2SiF_6$ were added, and the total volume was adjusted to 46.0 liters with water. The concentrations in the resulting slurry were then:

$TiO_2 = 106$ g./l.

$H_2SiF_6 = 14.6$ g./l. (about 1.5% by weight)

The temperature of the slurry was maintained at 70° C. by using a glass immersion heater. While agitating at 450 r.p.m. with a plastic impeller, 3.78 liters of an aqueous sodium silicate solution ($SiO_2:Na_2O = 2.0$; $Na_2O$ conc. = 225 g./l.) were added at a uniform rate over a period of three hours. The final pH was 7.2. The resulting slurry was cooled and filtered, and the filter cake was washed on the filter with a volume of water equal to about three times the volume of the original filtrate. The washed cake was dried at 110° C. and was micropulverized. A yield of 7.0 kg. of composite pigment was obtained which analyzed 69.5% $TiO_2$ and the balance silica plus 1.7% water determined by loss on ignition. This product was therefore nominally a 70% $TiO_2$–30% $SiO_2$ composite pigment.

PERFORMANCE IN PAPER

Five hundred grams of Puget Sound bleached sulfite pulp were beaten with 23 liters of demineralized water to 540 ml. Schopper-Riegler freeness. After beating had been completed, the pulp was divided into aliquot parts each containing 28.3 g. of oven-dry fiber. Each portion was used for testing one pigment sample.

Three grams of oven-dry pigment were dispersed in 200 cc. of distilled water by mixing the two materials together for five minutes in a Waring Blendor. The pigment dispersion was washed into one of the pulp suspensions previously described with 200 cc. of distilled water. The pigment dispersion was then mixed with the pulp suspension for five minutes in a TAPPI Standard pulp disintegrator. After mixing, the pigmented pulp was poured into the proportioning tank of a Noble and Wood handsheet machine where it was further diluted with demineralized water to provide a suspension containing 2.06 g. of oven-dry fiber per liter of suspension.

A two-quart (1,892 ml.) volume of pigmented pulp suspension was drawn from the proportioning tank and poured into the Noble and Wood sheet mold which had been partially filled with demineralized water. The pigmented stock in the sheet mold was further diluted with demineralized water until the water level mark on the sheet mold had been reached. The 1,892 ml. of pigmented stock that was originally added to the sheet mold was now diluted to approximately 21 liters. The required volume of a 6.5% alum solution necessary to adjust the 21 liters of suspension to a pH of 5.0 was then added. The suspension was manually mixed for approximately five seconds. The drop valve on the sheet mold was then opened to allow the water and the unretained pigment to drain away from the fiber which was deposited on the screen of the sheet mold. The wet sheet and the supporting screen were pressed and drum dried, and the dried sheet was calendered to develop a smoother surface by passing it ten times through a cotton-steel nip with a 1,666 pound per lineal inch loading. After calendering, the handsheets were analyzed to determine the percent ash and the percent $TiO_2$ and were tested to determine opacity, brightness and basis weight, all by using TAPPI Standard methods.

This procedure, which yields a basic weight of 30 pounds for 500 sheets of paper 25 inches by 38 inches, was used in reporting data in all of the preceding tables herein and was used in testing the paper made with the composite pigment of the foregoing example. The results of these tests, along with comparable results using a physical admixture of virtually the same proportions of titanium dioxide and silica, are summarized as follows:

TABLE V

| Pigment | Pigment in Furnish [1] (Weight Percent) | Percent Pigment Retention [2] | Percent Brightness [3] | Percent Opacity [4] |
|---|---|---|---|---|
| $TiO_2$ | 9.58 | 28.9 | 87.5 | 70.4 |
| Blend (70% $TiO_2$ plus 30% $SiO_2$) | 9.58 | 27.5 | 88.4 | 69.4 |
| Composite (70% $TiO_2$–30% $SiO_2$) | 9.58 | 34.5 | 88.6 | 72.1 |

[1] Based on oven-dry furnish solids.
[2] In single pass through system.
[3] Brightness by TAPPI Method T-452.
[4] Opacity by TAPPI Method T-425.

The composite pigments of the invention, in addition to their improved retention and opacity, are more favorably affected than straight titanium dioxide by the conventional retention aids used in paper making operations. They are also less adversely affected than straight titanium dioxide by other components (such as oxidized starch)

which normally tend to decrease pigment retention, as shown in the following table:

TABLE VI

| Pigment | Figment in Furnish [1] (Weight Percent) | Oxidized Starch in Furnish [2] (Weight Percent) | Percent Pigment Retention [3] | Percent Brightness [4] | Percent Opacity [5] |
|---|---|---|---|---|---|
| $TiO_2$ | 9.58 | 0 | 37.5 | 88.8 | 74.5 |
| $TiO_2$ | 9.58 | 2 | 23.4 | 87.4 | 69.8 |
| Blend (70% $TiO_2$ plus 30% $SiO_2$) | 9.58 | 0 | 30.5 | 88.0 | 72.3 |
| Blend (70% $TiO_2$ plus 30% $SiO_2$) | 9.58 | 2 | 22.6 | 87.4 | 68.9 |
| Composite (70% $TiO_2$–30% $SiO_2$) | 9.58 | 0 | 33.9 | 88.1 | 74.2 |
| Composite (70% $TiO_2$–30% $SiO_2$) | 9.58 | 2 | 34.1 | 88.2 | 72.7 |

[1] Based on oven-dry furnish solids.
[2] Based on fiber.
[3] In single pass through system.
[4] Brightness by TAPPI Method T-452.
[5] Opacity by TAPPI Method T-425.

The composite pigments of the invention also tend to reduce foaming during the paper making operation and cause less clogging of the felts used in the second stage compression drying of conventional paper making operations.

We claim:

1. The method of producing a titanium dioxide-silica composite pigment which comprises precipitating on suspended titanium dioxide pigment particles silica in an amount to provide at least about 20% by weight of silica in the composite pigment, the silica being formed by progressively neutralizing with an aqueous sodium silicate solution, in the presence of the suspended titanium dioxide pigment, a dilute acidic aqueous fluoride solution of the group consisting of (a) a fluosilicic acid solution, (b) a sodium fluoride solution acidified with a mineral acid, (c) a hydrofluoric acid solution, (d) a sodium fluosilicate solution, and (e) a mixture of fluosilicic acid and a mineral acid.

2. The method according to claim 1 in which the neutralization is carried out at a temperature of at least 40° C.

3. The method according to claim 1 in which the neutralization is carried out at a temperature between about 60° and 80° C.

References Cited

UNITED STATES PATENTS

| 2,113,380 | 4/1938 | Nichols | 106—300 |
| 2,144,577 | 1/1939 | Petersen | 106—300 |
| 2,296,636 | 9/1942 | Hanahan | 106—300 |
| 2,885,366 | 5/1959 | Iler | 106—300 |

FOREIGN PATENTS

| 448,345 | 6/1936 | Great Britain. |
| 481,317 | 3/1938 | Great Britain. |

TOBIAS E. LEVOW, *Primary Examiner.*

S. E. MOTT, *Assistant Examiner.*